(12) United States Patent
Cohen et al.

(10) Patent No.: US 7,644,026 B2
(45) Date of Patent: Jan. 5, 2010

(54) RANKING SYSTEMS BASED ON A RISK

(75) Inventors: Ira Cohen, Sunnyvale, CA (US);
William R. Powers, III, San Francisco, CA (US); Anish P. Joseph, Bangalore (IN); En C. Lee, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 280 days.

(21) Appl. No.: 11/586,461

(22) Filed: Oct. 25, 2006

(65) Prior Publication Data
US 2008/0103962 A1 May 1, 2008

(51) Int. Cl.
*G06Q 40/00* (2006.01)
(52) U.S. Cl. ...................... 705/36 R; 705/37
(58) Field of Classification Search ............... 705/36 R, 705/37
See application file for complete search history.

(56) References Cited

U.S. PATENT DOCUMENTS 5,918,217 A * 6/1999 Maggioncalda et al. ... 705/36 R

OTHER PUBLICATIONS

Kusiak, A., "Support Vector Machines", downloaded Oct. 1, 2006.
Stoneburner, G. et al., "Risk Management Guide for Information Technology Systems", NIST 800-30, Jul. 2002.

* cited by examiner

*Primary Examiner*—Thu Thao Havan

(57) ABSTRACT

A method for ranking a plurality of systems based on their susceptibility to a selected risk that is determined from a plurality of risk indicators, is described herein. The method includes obtaining benchmark values for at least one benchmark system with a predetermined level of the predetermined risk; obtaining measured risk indicator values of the predetermined plurality of risk indicators in each of the plurality of systems, the predetermined plurality of risk indicators are the same in all of the plurality of systems; comparing the measured risk indicator values of each of the plurality of systems with the benchmark values of the at least one benchmark system; and ranking the plurality of systems based on the comparing to indicate the susceptibility of each of the plurality of systems to the predetermined risk.

19 Claims, 5 Drawing Sheets

US 7,644,026 B2

RANKING SYSTEMS BASED ON A RISK

BACKGROUND

Corporations are in the business of managing risks for financial gain. Depending on the industry in which it operates, a corporation must manage risks including but not limited to: information technology (IT) security risks to safeguard its IT assets and access to such assets; financial risks to ensure that its capital investments will yield positive returns; and management risks to ensure honest, effective, and constructive management of its organization, especially in the aftermath of ENRON and WORLDCOM.

A corporation typically manages its risks through internal audits of its systems and organizations. Thus, each targeted system or organization is physically audited in isolation to determine the risk posed by such a system or organization. This process is manual, time consuming, and expensive. Furthermore, because each individual audit is performed in isolation and dependent on the target system or organization, the resulting risk assessments are inconsistent and do not provide a clear picture of the overall risk of the corporation. For example, current risk auditing tools typically present auditors and system owners with all risk indicators for a given system or organization. Thus, the metrics of one system may be overlaid graphically with the metrics of one or more other systems. However, there is no attempt by conventional risk auditing tools to combine all risk indicators and provide rankings among the various systems based on the same risk indicators or to automatically report or direct attention towards high risk areas of a given system. Consequently, it is left to the viewer of the graphs and data to determine which are the riskier systems or riskier areas within a system.

BRIEF DESCRIPTION OF THE DRAWINGS

Embodiments are illustrated by way of example and not limited in the following figure(s), in which like numerals indicate like elements, in which.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

Described herein are methods and systems for consistently ranking systems or organizations based on their susceptibility to a given or predetermined potential risk, wherein the systems are ranked based on a comparison of measured values of Key Risk Indicators (KRIs) of the given risk with predetermined or generated benchmark values for such KRIs. As referred herein, a KRI of a given risk for a target system is a measurement based on system data which indicates the contribution of a particular system activity, activities, feature, or features to a system's exposure to the given risk. Thus, a KRI is chosen or predetermined based on a given risk and independent of the system to which it is applied. For example, the KRIs of an IT security risk in an IT system (or systems) include the number of administrators or users with access to the root directory of the IT system, the number of users with a particular access to the IT system, whether the applications used in the IT system are open-source applications, the number of characters required of user passwords to access the IT system, etc. The KRIs are typically provided by experts in the field of the system. Thus, for an IT system, IT experts may be consulted to create a list of KRIs of an IT security risk, which may be represented as a variable vector $K=[k_1, k_2, k_3, \ldots, k_n]$, wherein each $k_n$ is a variable representing a predetermined KRI.

Advantages of the methods and systems described herein over the prior art include but are not limited to: a) consistent ranking of all systems based on a single set of rules or factors so that an owner, administrator, or any other authorized personnel of any or all of the systems may modify or correct one or more systems to decrease the system risk and increase the system ranking; b) directing or aiding an auditor's focus on systems with the highest risk so that a more detailed physical audit may be performed on such systems for more efficient risk management; and c) providing guidance on which areas in a given system are the cause of higher risk for such a system so as to focus the attention of either or both the auditors and the system administrators (or owners) to audit or fix those processes or system components that relate to those high risk areas.

System

Figure 1:
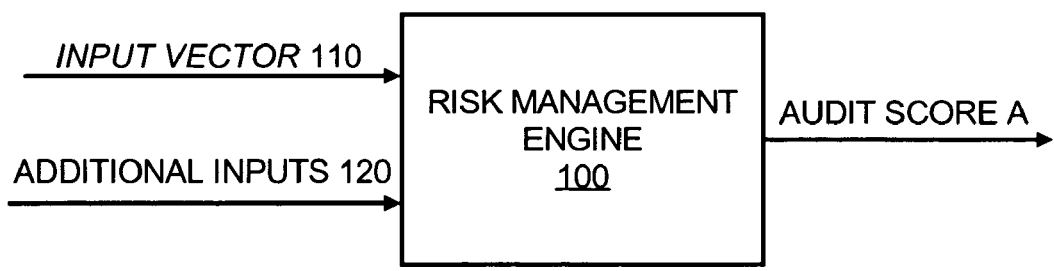
FIG. 1 illustrates a high-level diagram of a risk assessment engine 100 for risk ranking, in accordance with one embodiment of the present invention.

FIG. 1 illustrates a high-level diagram of a risk assessment engine 100 for risk ranking, in accordance with one embodiment of the present invention. The risk assessment engine 100 receives at input 110 measured values for a variable vector K of KRIs (hereinafter, "measured vector $K_v$") for each of a plurality of systems targeted for risk assessment and, optionally, additional inputs 120 as described later. This measured vector $K_v$ is represented by $K_v=[k_1, k_2, k_3, \ldots, k_n]=[v_1, v_2, v_3, \ldots, v_n]$, where each $v_n$ is a measured value for a corresponding KRI variable $k_n$. Alternative embodiments are contemplated wherein the received measured vector $K_v$ is a transformation of the originally collected or measured n values of KRIs. For example, as desired, the values $v_1, v_2, v_3, \ldots, V_n$ in the measured vector $K_v$ may represent normalized values of a group of KRIs by a single KRI, values of pairs of KRIs, trends of the KRIs over a predetermined period of time in the past or in the future. Such a transformation or normalization may be desired when, for example, those systems targeted for risk assessment are of different sizes, resulting in different KRI values. Thus, transforming or normalizing the input KRI values make them invariant to the size of the systems. Additional embodiments are contemplated wherein the measured vector $K_v$ is the originally collected or measured n values of KRIs that is then transformed as described above within the risk assessment engine 100.

The risk assessment engine 100 is operable to perform a risk assessment of each target system based on the received input or inputs, and outputs at 130 an audit value or score A for the target system indicating a predicted risk assessment of the system. The audit value may be numeric with a range to specify the risk of the engine 100. For example, the audit value may have a range of A=1-10 for IT security risk, whereby a value of "1" indicates that the engine 100 has the lowest IT security risk (e.g., most able to prevent unauthorized accesses, system attacks, and virus attacks) and a value of "10" indicates that the engine 100 has the highest IT security risk (e.g., least able to prevent unauthorized accesses, system attacks, and virus attacks). Alternative embodiments are contemplated wherein the audit value may be other than numeric to specify the risk of the engine 100. For example, the audit value may be A="very good," "good," "neutral," "bad," and "very bad," whereby a value "very good" indicates that the engine 100 has the lowest IT security risk and a value of "very bad" indicates that the engine 100 has the highest IT security risk.

In one embodiment, the risk assessment engine 100 may be implemented by one or more software programs, applications, or modules having computer-executable programs that include code for the processes described below from any suitable computer-programming language, such as C, C++, C##, Java, or the like, which are executable by one or more computerized systems, each including a computer or a network of computers. Examples of a computerized system include but are not limited to one or more desktop computers, one or more laptop computers, one or more mainframe computers, one or more networked computers, one or more processor-based devices, or any similar types of systems and devices. Thus, the computerized system includes one or more processors of any of a number of computer processors, such as processors from Intel, Motorola, AMD, Cyrix. Each processor is coupled to or includes at least one memory device, such as a computer readable medium (CRM). The processor is operable to execute computer-executable programs instructions stored in the CRM, such as the computer-executable programs to implement one or more of the aforementioned models for performance determination, application consolidation, or both. Embodiments of a CRM include, but are not limited to, an electronic, optical, magnetic, or other storage or transmission device capable of providing a processor of the server with computer-readable instructions. Other examples of a suitable CRM include, but are not limited to, a floppy disk, CD-ROM, DVD, magnetic disk, memory chip, ROM, RAM, an ASIC, a configured processor, any optical medium, any magnetic tape or any other magnetic medium, or any other medium from which a computer processor is operable read instructions.

Process

The various methods or processes for ranking a plurality of systems based on a predetermined potential risk are now described with reference to the various process flows illustrated in FIGS. 2-6. For illustrative purposes only and not to be limiting thereof, the various methods are discussed in the context of the risk assessment engine 100 illustrated in FIG. 1. Also, the process flows are described with exemplary reference to the ranking of IT systems based on their IT security risks. However, it should be understood that such processes, or any part thereof, are applicable for any other systems or organizations and any other types of risk. For example, the processes may be employed to rank financial trading systems based on financial risk. The KRIs for the financial risk then include average collection time on accounts payable, percentage of bad debt, average interest rates on loans, etc. In another example, the processes may be employed to rank companies on the risk of employment litigation. The KRIs for the employment litigation risk then include the frequency of employee reviews, the frequency of employee conduct training, the number of supervisory oversights, etc. Furthermore, the processes, or any part of any one process, may be initiated by users interested in assessing one or more particular risks in one or more particular systems. Thus, as referred herein, the users potentially include system auditors, administrators, or other authorized in-house personnel of an organization wishing to perform a risk assessment of one or more of the organization's systems, or outside consultants or auditors providing a risk assessment of an organization and the systems therein.

Figure 2:
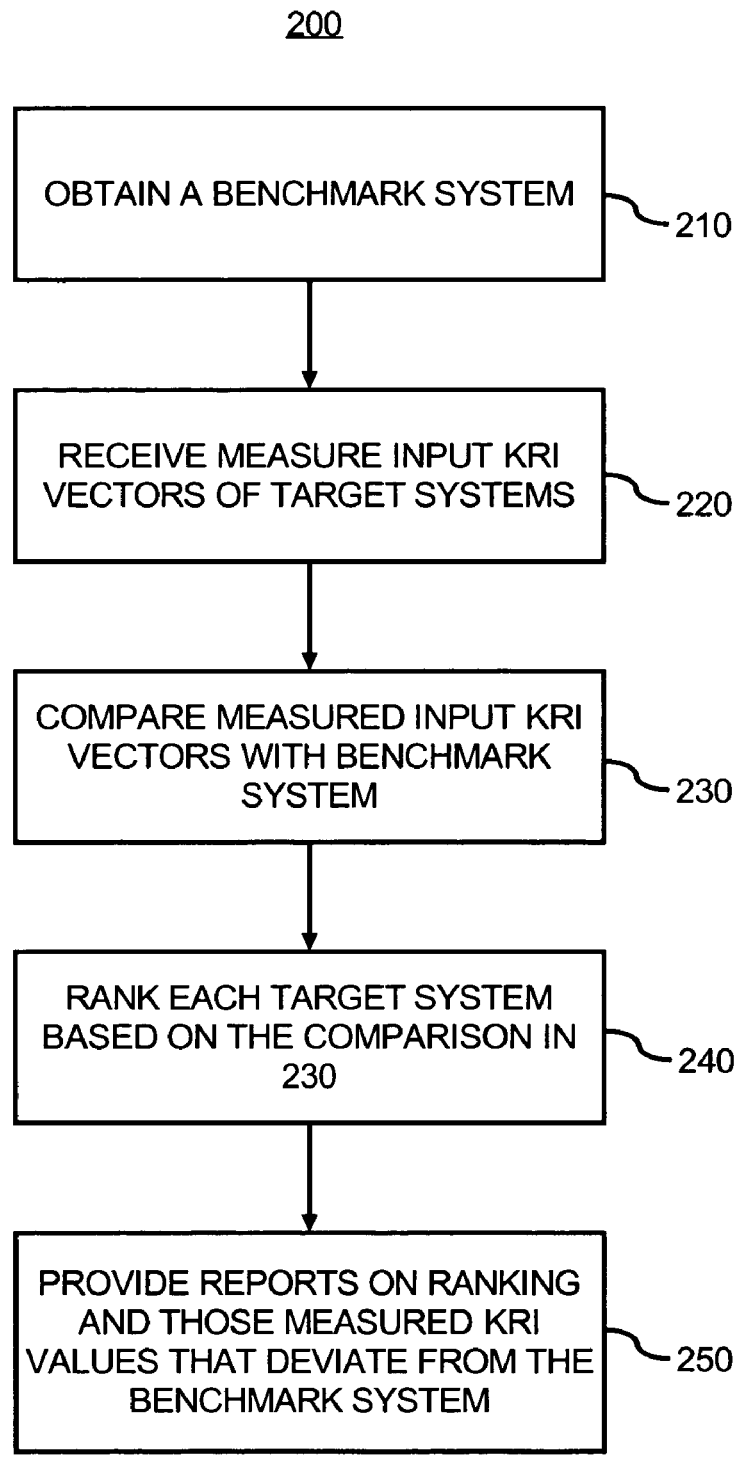
FIG. 2 illustrates a process flow 200 for ranking a plurality of IT systems based on a given risk, in accordance with one embodiment of the present invention.

FIG. 2 illustrates a process flow 200 for ranking a plurality of IT systems based on a potential IT security risk, in accordance with one embodiment of the present invention.

At 210, the benchmark values for KRIs and their weights are obtained or determined from one or more benchmark systems. For example, such benchmark values of a benchmark IT system that is considered to have a low IT security risk are obtained or determined. In another example, such benchmark values are obtained or determined from multiple benchmark systems of varying levels of IT security risk, In one embodiment, a benchmark IT system includes a benchmark KRI vector $B=[b_1, b_2, \ldots, b_n]$, where each $b_n$ represents a benchmark value for a corresponding KRI variable $k_n$. In another embodiment, the benchmark IT system includes both a benchmark KRI vector B and a weight vector $W=[w_1, w_2, \ldots, w_n]$, with each weight value $w_n$ assigned to a corresponding KRI variable $k_n$.

As referred herein, the benchmark KRI vector B includes benchmark values $b_1, b_2, \ldots, b_n$ that are desired so as to provide an IT system with an audit score A indicating that the IT system exhibits IT security risk at a desirable level (e.g., lowest IT security risk). In one embodiment, each value $b_n$ represents a single ideal value for benchmarking the particular KRI variable $k_n$. Alternatively, each value $b_n$ represents a range of ideal values. In an alternative embodiment, each value $b_n$ represents a single threshold value, which divides the possible range of KRI values into two regions, one on each side of the threshold value. One region is then designated as a low-risk region and the other region is designated as a high-risk region. In another alternative embodiment, each value $b_n$ represents a range of threshold values, which divide the possible range of KRI values into multiple regions, each representing a particular level of risk ("low risk," "medium risk," "high risk," etc.) As also referred herein, each weight value $w_n$ is associated with a corresponding KRI variable $k_n$ to indicate the importance or contribution of such a variable, relative to other variables in the input KRI vector K, to the IT security risk of an IT system.

Figure 3:
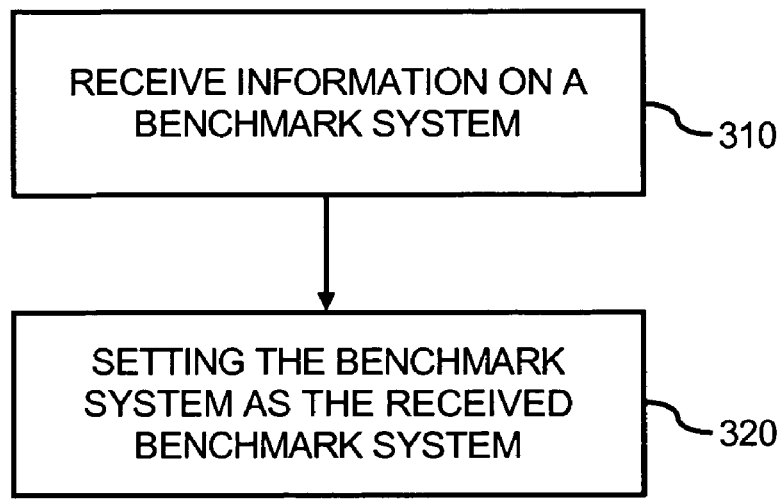
FIGS. 3-6 illustrate various methods in which a benchmark IT system is obtained or determined, in accordance with various embodiments of the present invention.

FIGS. 3-6 illustrate various methods in which a benchmark IT system is obtained or determined. FIG. 3 illustrates one such method 300 based on known information on a selected IT system. At 310, the risk assessment engine 100 receives information on a particular benchmark IT system at the inputs 120 (FIG. 1). The received information includes benchmark KRI values and, optionally, the weight values thereof that may have been specified by one or more users, who may be IT system auditors, experts, or those with knowledge in the IT field. At 320, the risk assessment engine 100 then automatically sets the benchmark IT system to be used for ranking in accordance with the received benchmark IT system.

Figure 4:
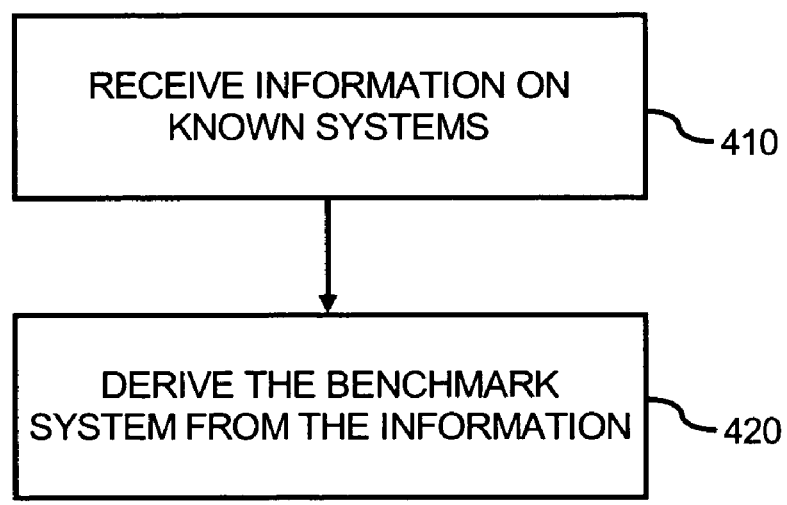

FIG. 4 illustrates another method 400 for determining a benchmark IT system based on known information on one more selected IT systems. At 410, the risk assessment engine 100 receives information on one or more known IT systems at the inputs 120 (FIG. 1) that may be used as benchmark systems, such as a known least risky IT system, a known most risky IT system, or both, or multiple known IT systems of varying levels of IT security risk. Such information may be provided by one or more users. At 420, the benchmark values are derived from the received information. In the case of a known least risky IT system, its measured KRI values and weights thereof may be extracted from the received information on such a system and used as the benchmark KRI values and weights thereof, respectively. In the case of a known most risky IT system, its measured KRI values and weights thereof also may be extracted from the received information on such a system. The measured KRI values then may be used as threshold values in the benchmark IT system, and the weights thereof may be used as the KRI weights in the risk assessment engine 100. In the case of multiple known IT systems of varying levels of IT security risk, the benchmark KRI values and weights thereof may be extracted through extrapolation of the received information of the multiple known IT systems, which may or may not include the most risky or least risky system and may include a number of high risk systems as well.

Figure 5:
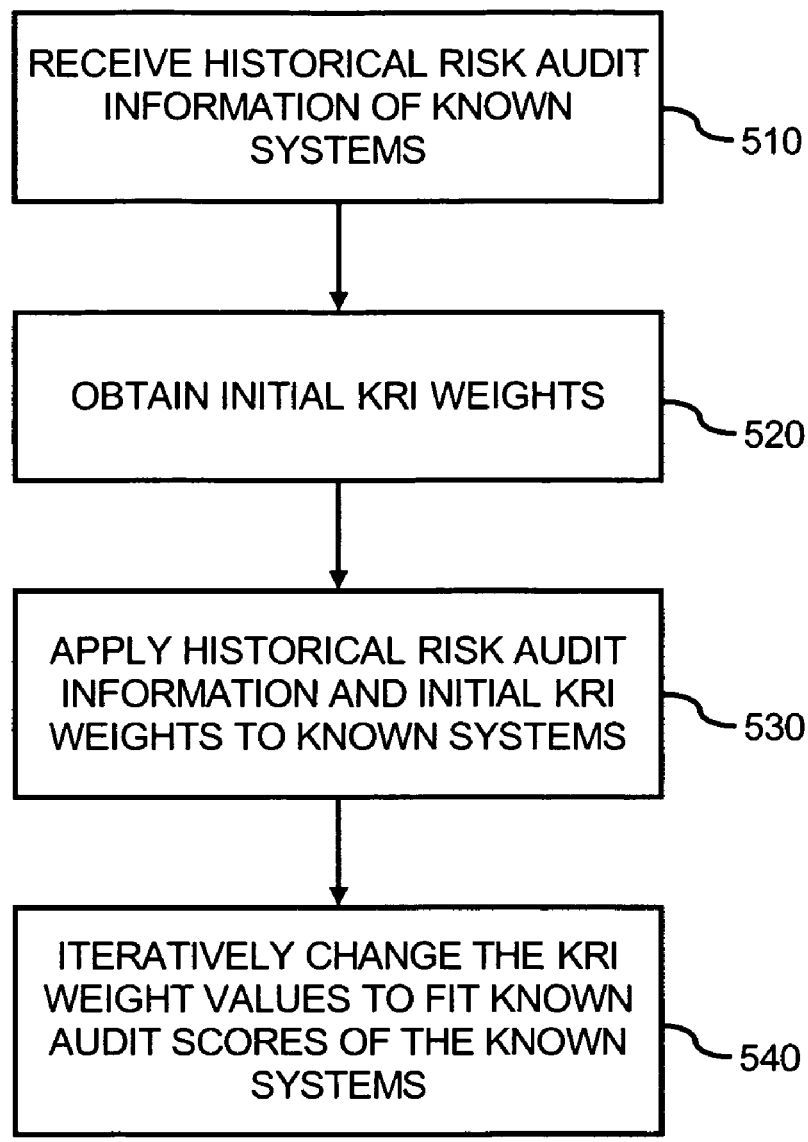

FIG. 5 illustrates a method 500 for determining a benchmark IT system based on historical risk audit reports (or information) of known IT systems for which there are no weights applied to the KRIs or such weights are not readily known or available from the historical risk audit reports. As referred herein, known IT systems are those with known system models. At 510, the risk assessment engine 100 receives, for example, at the inputs 120 (FIG. 1) the historical risk audit reports of selected known IT systems, which may include the predetermined benchmark KRI values of such systems. The historical risk audit reports may be provided by a user or users, for example, as described above. At 520, the risk assessment engine 100 also obtains initial weights for the KRIs (hereinafter, "KRI weights"), as provided by one or more users. Alternatively, the risk assessment engine 100 is operable to automatically derive or generate the initial KRI weights based on the known IT systems and their historical risk audit reports. At 530, the historical risk audit information, including the predetermined benchmark KRI values therein, and initial KRI weights thereof are applied to these known IT systems. At 540, the weight values are then iteratively changed to match or fit with the resulting audit scores of the known IT systems in order to obtain optimal KRI weight values that correspond to the resulting audit scores of the known IT systems. The optimal KRI weight values are then used as the benchmark weight values for the KRIs. The weights may be iteratively changed by the risk assessment engine 100 in an automatic manner through use of any known statistical or pattern recognition algorithms. Alternatively, the risk assessment engine 100 allows input from one or more users to manually change the KRI weights.

Figure 6:
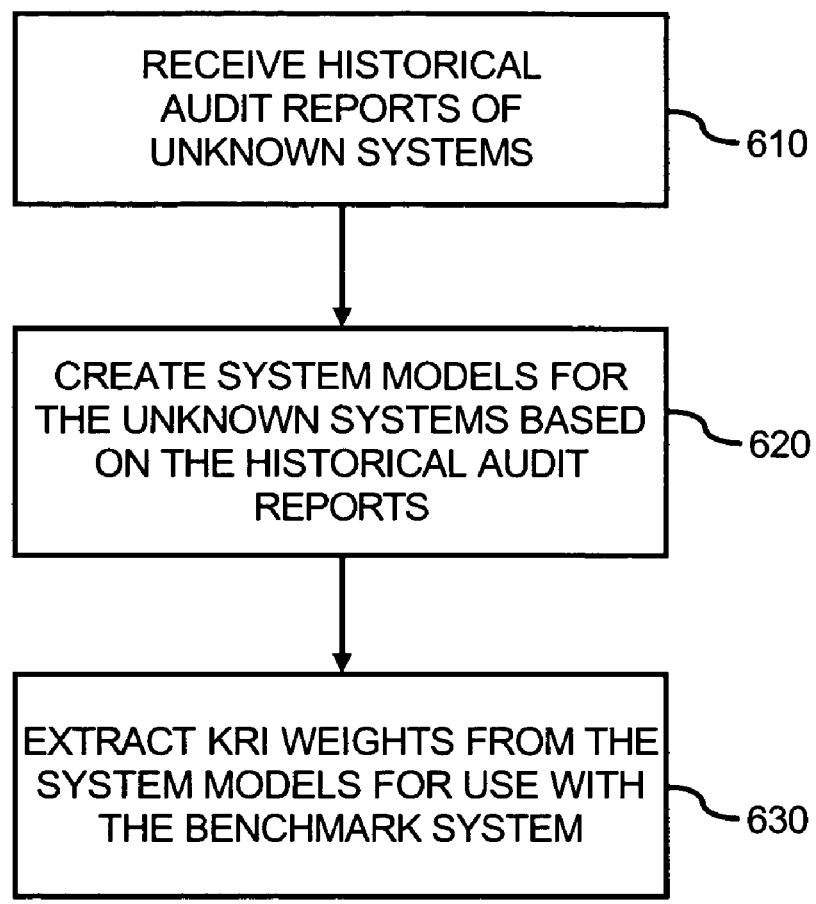

FIG. 6 illustrates another method 600 for determining a benchmark IT system based on historical risk audit reports of selected unknown IT systems for which system models are not known. At 610, the risk assessment engine receives, for example, at the additional inputs 120 (FIG. 1), the historical risk audit reports (or information) of the selected unknown IT systems, which may include the predetermined benchmark KRI values of such systems. At 620, the risk assessment engine 100 uses the historical risk audit reports to determine the system models of the unknown IT systems that map their measured KRI vectors to their corresponding output audit scores. The system model for each selected unknown IT system is desired because only their historical risk audit reports are available or known. Numerous methods or algorithms exist for statistical classification to create a regression or classifier as the transfer function for the engine 100. Examples of such algorithms include but are not limited to Naïve Bayes, support vector machines (SVMs), linear discrimination analysis (LDA), and artificial neural network models. Once the system models are determined, they are used to extract the weights for each KPI in a known manner. At 630, the risk assessment engine 100 extracts the KRI weights from the derived system models for use in the benchmark system along with predetermined benchmark KRI values.

Continuing with the process flow 200 in FIG. 2, at 220, the risk assessment engine 100 receives measured values of input KRI vectors of IT systems targeted for IT risk assessment and ranking.

At 230, the risk assessment engine 100 compares the measured values of an input KRI vector of each target IT system to the benchmark KRI values in the obtained or determined benchmark IT system. In one embodiment, if the benchmark KRI values are ideal values (or ranges of ideal values), the risk assessment engine 100 performs the comparison by computing a distance D between the measured input KRI vector and the benchmark KRI values in accordance with the following equation:

$$D = \sum_i w_i d_i(k_i, b_i),$$    Equation 1 where $w_i$ represents the weight, as obtained from the benchmark IT system, assigned to the particular KRI variable i. In one embodiment, the function $d_i(k_i,b_i)$ represents an absolute distance (Euclidean, L1 distance, cosine distance, etc.) between the particular KRI value $k_i$ and a corresponding benchmark value $b_i$ for the same KRI variable i, which may be computed by:

$$d_i(k_i,b_i)=(k-b)^2$$    Equation 2 or $$d_i(k_i,b_i)=|k-b|.$$    Equation 3

Thus, the function $d_i(k_i,b_i)$ may provide users with guidance on which areas in a given or target system are the cause or causes of higher risk.

In another embodiment, if the benchmark KRI values are threshold values, the risk assessment engine 100 performs the comparison by determining for each measured KRI value $k_i$ whether $k_i \geq b_i$ or $k_i < b_i$ (alternatively, $k_i > b_i$ or $k_i \leq b_i$) for the corresponding benchmark threshold value $b_i$. For each measured KRI value $k_i$ that resides in the high-risk region (i.e., either $k_i > b_i$ or $k_i < b_i$, depending on whether $b_i$ is an upper or lower threshold value), a "1" value or any other predetermined value is assigned to its corresponding function $d_i(k_i,b_i)$. For each measured KRI value $k_i$ that resides in the low-risk region, a "0" value or any other predetermined value different from the value for the low-risk region is assigned to its corresponding function $d_i(k_i,b_i)$. Equation 1 is then used to compute distance D, which now represents the audit score A of the target system and from which risk ranking of the target system can be determined.

In an alternative embodiment for the benchmark KRI values being ranges of threshold values, with each $b_i$ representing a range of values, the risk assessment engine 100 performs the comparison by determining for each measured KRI value $k_i$ whether it is in the range of a corresponding benchmark range of values $b_i$. For each measured KRI value $k_i$ that resides in the low-risk region (i.e., $k_i$ is within or outside of the range $b_i$, depending on whether the range indicates low-risk or high-risk), a "0" value or any other predetermined value is assigned to its corresponding function $d_i(k_i,b_i)$. For each measured KRI value $k_i$ that resides in the high-risk region, a "1" value or any other predetermined value is assigned to its corresponding function $d_i(k_i,b_i)$. Equation 1 is then used to compute distance D, which now represents the audit score A of the target system and from which risk ranking of the target system can be determined.

At 240, the risk assessment engine 100 ranks each of the target IT systems with respect to one another based on the comparison at 230. For example, the target IT system with the highest value for the computed distance D between measured input KRI vector and the benchmark KRI values is ranked as one with the highest IT security risk. As part of the ranking or prior to the ranking (for example, between 230 and 240 in FIG. 2), an audit score A may be given to each of the target IT systems to indicate its computed distance D, and thus its level of IT security risk as described earlier. For example, the target system with the highest value for the computed distance D is given the lowest possible audit score.

At 250, the risk assessment engine 100 is further operable to provide the users with reports or indications of the system ranking and which measured KRI values deviate the most from the benchmark system. Such reported or indicated information enables users such as auditors to focus more attention on high risk systems, making the audit process more efficient in terms of both time and costs. The reported or indicated information also enables users such as system owners or administrators to know how their systems rank with respect to other compatible systems so that they may attempt to correct their systems to achieve a desired risk level. The reported or indicated information also provides users with guidance on which areas in a given system are the cause or causes of higher risk so as to focus or direct the attention of system auditors, owners, or administrators to audit or fix processes that relate to those high risk areas.

What has been described and illustrated herein are embodiments along with some of their variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A method for ranking a plurality of systems based on their susceptibility to a selected risk that is determined from a plurality of risk indicators, comprising:
   obtaining benchmark values of at least one benchmark system that has a predetermined level of the predetermined risk, wherein obtaining benchmark values includes obtaining benchmark weight values by iteratively changing weight values of the benchmark values in accordance with audit scores that are obtained with the weight values;
   obtaining measured risk indicator values of the predetermined plurality of risk indicators in each of the plurality of systems, the predetermined plurality of risk indicators are the same in all of the plurality of systems;
   a computer system comparing, based on the benchmark weight values, the measured risk indicator values of each of the plurality of systems with the benchmark values of at least one benchmark system; and
   ranking the plurality of systems based on the comparing to indicate the susceptibility of each of the plurality of systems to the predetermined risk.

2. The method of claim 1, wherein obtaining benchmark values of at least one benchmark system comprises:
   receiving information on at least one selected system; and
   determining the benchmark values of the at least one benchmark system in accordance with the information on the at least one selected system.

3. The method of claim 1, wherein:
   obtaining benchmark values of at least one benchmark system includes obtaining benchmark values of each of a plurality of benchmark systems; and
   comparing the measured risk indicator values of each of the plurality of systems with the benchmark values of at least one benchmark system includes,
      extrapolating a set of benchmark values from the obtained benchmark values of the plurality of benchmark systems; and
      comparing the measured risk indicator values of each of the plurality of systems with the extrapolated set of benchmark values.

4. The method of claim 2, wherein:
   receiving information on the at least one selected system includes receiving measured risk indicator values of the predetermined plurality of risk indicators in the at least one selected system; and
   determining the benchmark values of the at least one benchmark system includes using the measured risk indicator values as the benchmark values of the at least one benchmark system.

5. The method of claim 2, wherein receiving information on the at least one selected system comprises:
   receiving information on at least one of a known least risky system for the selected risk and a known most risky system for the selected risk.

6. The method of claim 1, wherein obtaining benchmark values of the at least one benchmark system comprises:
   receiving historical risk audit information of selected known systems;
   obtaining initial weights on the predetermined plurality of risk indicators in the selected known systems;
   applying the historical risk audit information and the initial weights to the selected known systems; and
   iteratively changing the initial weights in the applying in accordance with resulting audit scores from the selected known systems to obtain the benchmark weight values on the predetermined plurality of risk indicators in the benchmark system.

7. The method of claim 1, wherein obtaining the benchmark system comprises:
   receiving historical risk audit information of selected unknown systems;
   determining system models for the selected unknown systems based on the historical risk audit information; and
   determining weights on the predetermined plurality of risk indicators in the benchmark system based on the determined system models.

8. The method of claim 1, wherein comparing the measured risk indicator values of each of the plurality of systems with the obtained benchmark values of the at least one benchmark system comprises:
   computing a distance between a vector of the measured risk indicator values in each of the plurality of systems and a vector of benchmark risk indicator values in the obtained benchmark values.

9. The method of claim 8, wherein ranking the plurality of systems comprises:
   identifying a first one of the plurality of systems having the vector of the measured risk indicator values with the shortest computed distance to the vector of benchmark risk indicator values; and ranking the first system as least susceptible to the selected risk in the plurality of systems.

10. The method of claim 8, wherein each of the benchmark risk indicator values is a single value.

11. The method of claim 8, wherein each of the benchmark risk indicator values is a range of values.

12. The method of claim 8, wherein each of the benchmark risk indicator values includes at least one threshold value for ranking the plurality of systems into at least two levels of the predetermined risk.

13. The method of claim 1, further comprising:
assigning an audit score to each of the plurality of systems based on the comparing.

14. The method of claim 8, wherein ranking the plurality of systems comprises:
ranking the plurality of systems from least susceptible to most susceptible to the selected risk based on the computed distance for each of the plurality of systems.

15. A method for identifying susceptibility of areas in a target system to a selected risk as determined from a plurality of risk indicators, comprising:
obtaining a benchmark system for a predetermined level of the predetermined risk, the benchmark system including benchmark risk indicator values for the plurality of risk indicators, wherein obtaining a benchmark system includes obtaining benchmark weight values by iteratively changing weight values of the benchmark risk indicator values in accordance with audit scores that are obtained with the weight values;
obtaining measured risk indicator values of the predetermined plurality of risk indicators in the target system;
a computer system comparing, based on the benchmark weight values, each of the measured risk indicator values of the target system with a corresponding one of the benchmark risk indicator values; and
identifying areas in the target system that are susceptible to the selected risk based on the comparing.

16. The method of claim 15, wherein each of the benchmark risk indicator values is a threshold value for classifying each of the areas of the target system as a high-risk area or a low risk area, and the comparing each of the measured risk indicator values of the target system with a corresponding one of the benchmark risk indicator values comprises:
determining whether the each measured risk indicator value of the target system reaches a corresponding one of the threshold values in the benchmark system; and
responsive to the determining that the each measure risk indicator value reaches the corresponding one of the threshold values in the benchmark system, classifying one of the areas in the target system that is associated with the each measured risk indicator value as one of a high-risk area and a low-risk area.

17. A computer readable medium on which is encoded program code for ranking a plurality of systems based on their susceptibility to a selected risk that is determined from a plurality of risk indicators, the encoded program code comprising:
program code for obtaining benchmark values of at least one benchmark system that has a predetermined level of the predetermined risk, wherein obtaining benchmark values includes obtaining benchmark weight values by iteratively changing weight values of the benchmark values in accordance with audit scores that are obtained with the weight values;
program code for obtaining measured risk indicator values of the predetermined plurality of risk indicators in each of the plurality of systems, wherein the predetermined plurality of risk indicators are the same in all of the plurality of systems;
program code for comparing, based on the benchmark weight values, the measured risk indicator values of each of the plurality of systems with the benchmark values of at least one benchmark system; and
program code for ranking the plurality of systems based on the comparing to indicate the susceptibility of each of the plurality of systems to the predetermined risk.

18. The computer-readable medium of claim 17, wherein the program code for obtaining benchmark values of at least one benchmark system comprises:
program code for receiving information on at least one selected system; and
program code for determining the benchmark values of the at least one benchmark system in accordance with the information on the at least one selected system.

19. The computer-readable medium of claim 17, wherein:
the program code obtaining benchmark values of at least one benchmark system includes program code for obtaining benchmark values of each of a plurality of benchmark systems; and
the program code for comparing the measured risk indicator values of each of the plurality of systems with the benchmark values of at least one benchmark system includes,
program code for extrapolating a set of benchmark values from the obtained benchmark values of the plurality of benchmark systems; and
program code for comparing the measured risk indicator values of each of the plurality of systems with the extrapolated set of benchmark values.

* * * * *